United States Patent
Du

(10) Patent No.: US 12,026,937 B2
(45) Date of Patent: Jul. 2, 2024

(54) METHOD FOR GENERATING CLASSIFICATION MODEL, ELECTRONIC DEVICE, AND MEDIUM

(71) Applicant: BEIJING BAIDU NETCOM SCIENCE TECHNOLOGY CO., LTD., Beijing (CN)

(72) Inventor: Yuting Du, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 353 days.

(21) Appl. No.: 17/531,575

(22) Filed: Nov. 19, 2021

(65) Prior Publication Data

US 2022/0083813 A1 Mar. 17, 2022

(30) Foreign Application Priority Data

Feb. 10, 2021 (CN) .......................... 202110185389.1

(51) Int. Cl.
*G06F 18/241* (2023.01)
*G06F 18/214* (2023.01)
(Continued)

(52) U.S. Cl.
CPC ............ *G06V 10/82* (2022.01); *G06F 18/214* (2023.01); *G06F 18/241* (2023.01); *G06N 20/00* (2019.01);
(Continued)

(58) Field of Classification Search
None
See application file for complete search history.

(56) References Cited

U.S. PATENT DOCUMENTS

2021/0326639 A1* 10/2021 Yang ...................... G06V 10/82

FOREIGN PATENT DOCUMENTS

| CN | 109784182 A | 5/2019 |
| CN | 110866140 A | 3/2020 |

(Continued)

OTHER PUBLICATIONS

Melekhov et al., "Siamese Network Features for Image Matching," 2016 23rd International Conference on Pattern Recognition (ICPR), pp. 378-383, IEEE, Cancún Center, Cancún, Mexico (Dec. 4-8, 2016).

(Continued)

*Primary Examiner* — Dov Popovici
(74) *Attorney, Agent, or Firm* — Leydig, Voit & Mayer, Ltd.

(57) ABSTRACT

Methods, apparatuses, electronic devices, and mediums related to classification models are provided. The method may include: obtaining a set of positive samples and a set of negative samples, a sample in the set of positive samples including a pair of images from a first image set annotated as similar with each other, and a sample in the set of negative samples including a pair of images annotated as dissimilar with each other from the first image set; training a first sub-network based on the set of positive samples and the set of negative samples; constructing a classification model including a second sub-network, where initial weights of the second sub-network are weights of corresponding nodes of the trained first sub-network; and training the classification model using a second image set that includes at least one image that is common with at least one image in the first image set.

20 Claims, 6 Drawing Sheets

(51) Int. Cl.
  *G06N 20/00* (2019.01)
  *G06V 10/74* (2022.01)
  *G06V 10/764* (2022.01)
  *G06V 10/82* (2022.01)
  *G06V 10/94* (2022.01)
(52) U.S. Cl.
  CPC .......... *G06V 10/761* (2022.01); *G06V 10/764* (2022.01); *G06V 10/95* (2022.01)

(56) References Cited

FOREIGN PATENT DOCUMENTS

| | | |
|---|---|---|
| CN | 111340105 A | 6/2020 |
| CN | 112241764 A | 1/2021 |
| EP | 3869403 A2 | 8/2021 |
| WO | 2020232977 A1 | 11/2020 |

OTHER PUBLICATIONS

Chopra et al., "Learning a Similarity Metric Discriminatively, with Application to Face Verification," IEEE Computer Society Conference on Computer Vision and Pattern Recognition (CVPR'05), Courant Institute of Mathematical Sciences, New York University, New York, USA (2005).

Sun et al., "Seeing What is Not There: Learning Context to Determine Where Objects Are Missing," 2017 IEEE Conference on Computer Vision and Pattern Recognition, pp. 1234-1242, IEEE Computer Society (2017).

Zhang et al., "HSI Classification Algorithm Based on Few-Shot Learning," School of Computer Science and Technology, Xidian University, Xi'an, China (May 20, 2020).

* cited by examiner

200

S201 Obtain a positive sample set and a negative sample set, wherein a sample in the positive sample set comprises an image pair annotated as similar in a first image set, and a sample in the negative sample set comprises an image pair annotated as dissimilar in the first image set

S202 Train a first sub-network on the basis of the positive sample set and the negative sample set

S203 Construct a classification model, wherein the classification model comprises a second sub-network, and an initial weight of the second sub-network is a trained weight of a corresponding node of the first sub-network

S204 Train the classification model by using a second image set as a training set, wherein the second image set and the first image set share at least some images that are the same

*Fig. 2*

METHOD FOR GENERATING CLASSIFICATION MODEL, ELECTRONIC DEVICE, AND MEDIUM

CROSS REFERENCE TO RELATED APPLICATIONS

This application claims priority to Chinese Patent Application No. 202110185389.1, filed on Feb. 10, 2021, the contents of which are hereby incorporated by reference in their entirety for all purposes.

TECHNICAL FIELD

The present disclosure relates to artificial intelligence, particularly to computer vision, and further to image classification, and particularly relates to a method for generating a classification model, an electronic device, and a computer-readable storage medium.

BACKGROUND ART

Artificial intelligence is a subject on making a computer to simulate certain thinking processes and intelligent behaviors (such as learning, reasoning, thinking, planning, etc.) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

An image often contains different target information, and therefore, it is desirable to use a classification model to classify targets in the image.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a computer-implemented generation method for generating a classification model, a classification method, an electronic device, and a computer program product.

According to an aspect of the present disclosure, provided is a computer-implemented generation method for generating a classification model, the method including: obtaining a set of positive samples and a set of negative samples, a sample in the set of positive samples including a pair of images from a first image set annotated as similar with each other, and a sample in the set of negative samples including a pair of images annotated as dissimilar with each other from the first image set; training a first sub-network based on the set of positive samples and the set of negative samples; constructing a classification model, the classification model including a second sub-network, and initial weights of the second sub-network being weights of corresponding nodes of the trained first sub-network; and training the classification model by using a second image set as a training set, wherein at least one image in the second image set is common with at least one image in the first image set.

According to another aspect of the present disclosure, provided is an electronic device, including: at least one processor; and a memory communicatively connected to the at least one processor, where the memory stores instructions executable by the at least one processor, and when executed by the at least one processor, the instructions cause the at least one processor to perform a method comprising obtaining a set of positive samples and a set of negative samples, wherein a sample in the set of positive samples includes a pair of images from a first image set annotated as similar with each other, and a sample in the set of negative samples includes a pair of images from the first image set annotated as dissimilar with each other; training a first sub-network based on the set of positive samples and the set of negative samples; constructing a classification model, the classification model including a second sub-network, initial weights of the second sub-network being weights of corresponding nodes of the trained first sub-network; and training the classification model by using a second image set as a training set, the second image set having at least part of images thereof in common with the first image set.

According to another aspect of the present disclosure, provided is a computer program product, including a computer program, where when the computer program is executed by a processor, a method comprising obtaining a set of positive samples and a set of negative samples, wherein a sample in the set of positive samples includes a pair of images from a first image set annotated as similar with each other, and a sample in the set of negative samples includes a pair of images from the first image set annotated as dissimilar with each other; training a first sub-network based on the set of positive samples and the set of negative samples; constructing a classification model, the classification model including a second sub-network, initial weights of the second sub-network being weights of corresponding nodes of the trained first sub-network; and training the classification model by using a second image set as a training set, wherein at least one image in the second image set is common with at least one image in the first image set.

It should be understood that the content described in this section is not intended to identify critical or important features of the embodiments of the present disclosure, and is not used to limit the scope of the present disclosure. Other features of the present disclosure will be easily understood through the following specification.

BRIEF DESCRIPTION OF THE DRAWINGS

The drawings exemplarily show embodiments and form a part of the specification, and are used to explain exemplary implementations of the embodiments together with a written description of the specification. The embodiments shown are merely for illustrative purposes and do not limit the scope of the claims. Throughout the drawings, identical reference signs denote similar but not necessarily identical elements.

FIG. 2 is a flowchart of a generation method for a classification model according to an embodiment of the present disclosure;

DETAILED DESCRIPTION OF EMBODIMENTS

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope of the present disclosure. Likewise, for clarity and simplicity, description of well-known functions and structures are omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, depending on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

Embodiments of the present disclosure will be described below in detail in conjunction with the drawings.

Figure 1:
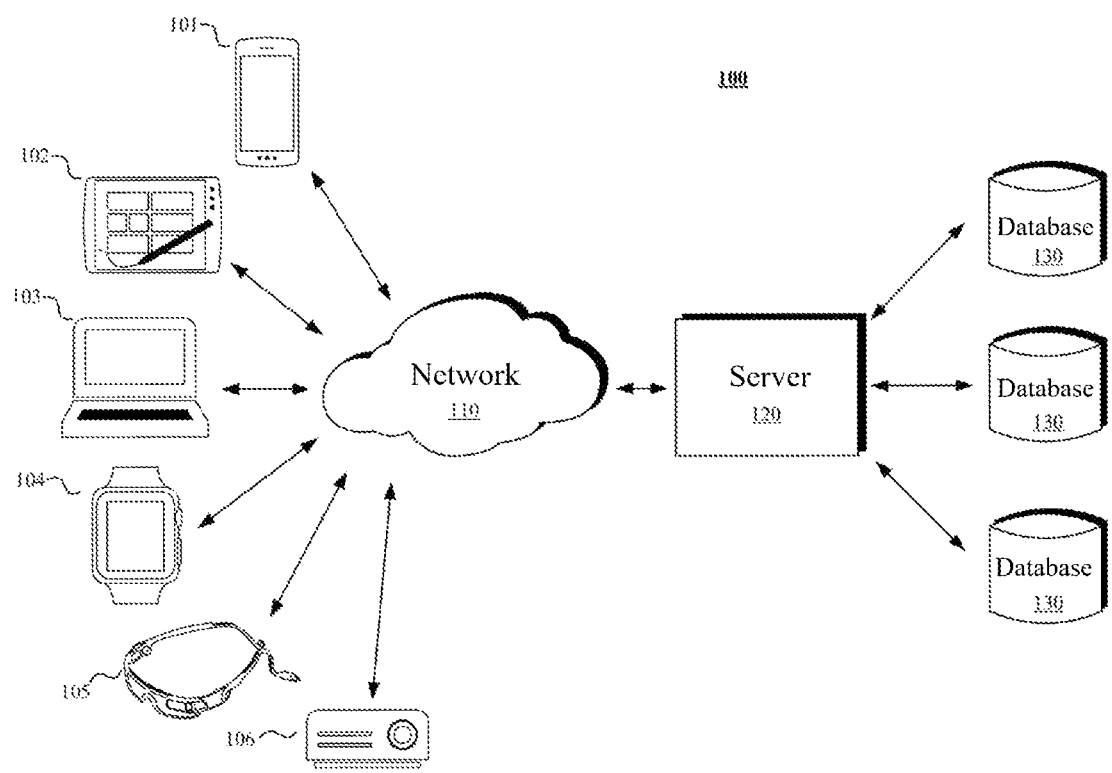
FIG. 1 is a schematic diagram of an exemplary system in which various methods described herein can be implemented according to an embodiment of the present disclosure.

FIG. 1 is a schematic diagram of an exemplary system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more application programs.

In an embodiment of the present disclosure, the server 120 can run one or more services or software applications that enable a generation method for a classification model or a classification method according to the embodiments of the present disclosure to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may use the client devices 101, 102, 103, 104, 105, and/or 106 to, for example, generate a classification model, run the classification model, upload a picture, or view a classification result. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices can run various types and versions of software application programs and operating systems, such as Microsoft Windows, Apple iOS, a UNIX-like operating system, and a Linux or Linux-like operating system (e.g., Google Chrome OS); or include various mobile operating systems, such as Microsoft Windows Mobile OS, iOS, Windows Phone, and Android. The portable handheld device may include a cellular phone, a smartphone, a tablet computer, a personal digital assistant (PDA), etc. The wearable device may include a head-mounted display and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and a video file. The data repository 130 may reside in various locations. For example, a data repository used by the server 120 may be locally in the server 120, or may be remote from the server 120 and may communicate with the server 120 via a network-based or dedicated connection. The data repository 130 may be of different types. In some embodiments, the data repository used by the server 120 may be a database, such as a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

The following describes, in conjunction with FIG. 2, a generation method 200 for a classification model according to an embodiment of the present disclosure.

At step S201, a set of positive samples and a set of negative samples are obtained, a sample in the set of positive samples including a pair of images from a first image set annotated as similar with each other, and a sample in the set of negative samples including a pair of images annotated as dissimilar with each other from the first image set.

At step S202, a first sub-network is trained based on the set of positive samples and the set of negative samples.

At step S203, a classification model is constructed, the classification model including a second sub-network, and initial weights of the second sub-network being weights of corresponding nodes of the trained first sub-network.

At step S204, the classification model is trained by using a second image set as a training set, wherein at least one image in the second image set is common with at least one image in the first image set.

In addition, with the method 200, the training of the classification model can be split into two steps, a pre-training performed first based on similarity, and then a target recognition model trained based on pre-trained weights. A training process of these two steps may be based on samples that are same, or at least part thereof same, with each other. First, supervised learning based on a manually annotated similarity is performed, so that with the help of supervised learning, a neural network can decrease a feature distance between similar images/increase a feature distance between dissimilar images. On this basis, unsupervised learning of a target recognition and classification network is then performed. This can simplify the training process.

According to the method in this embodiment of the present disclosure, firstly, similarity annotation may be performed on sample images, and a similarity network (the first sub-network) may be trained by using the annotated image pairs, so that the trained network can recognize similar pictures. Next, weights of the trained first sub-network is used as initial weights of a portion (for example, a feature extraction portion) of the classification model, and on this basis, the classification model is trained based on the same samples. In this way, the training process of the classification model can be greatly simplified. According to some embodiments, the second sub-network is used as a feature extraction portion of the classification model. By using the second sub-network as the feature extraction portion of the classification model, and since the initial weights of the second sub-network have already been trained to make dissimilar pictures separate as much as possible, the subsequent training of target classification can be more effective.

According to some embodiments, constructing a classification model includes using the trained first sub-network as the second sub-network in an initial state, and using a second loss function that is different from a first loss function of the first sub-network as a loss function of the classification model. The classification model can be constructed by using the first sub-network that has been trained as the feature extraction portion and changing the loss function, thereby avoiding a complex process of network reconstruction.

The second image set and the first image set have at least part of images thereof in common. According to some embodiments, the first image set and the second image set are the same image set. The two networks can be trained using a same set of samples. The number of samples can be reduced, and the combination of similarity feature extraction and target recognition from the same sample set also facilitates the network to learn an association therein, which further reduces time required for network training.

Various sample image sets may be used to perform targeted training on the classification model, and a generated classification model has diverse target recognition capabilities. As an example, in addition to simple classification of target objects, the classification model according to the present disclosure can implement classification of event types (for example, event subject status). According to some embodiments, each image in the first image set and each image in the second image set includes an event subject, the pair of images annotated as similar with each other includes images containing the same event subject, and the pair of images annotated as dissimilar with each other includes images containing different event subjects. For this purpose, in the first step of training, images may be classified based on the event subject. Images containing same event subject may include images of the same event subject from the same viewing angle or different viewing angles. For example, photos taken of the same trash bin from the same viewing angle or different viewing angles may be classified as a pair of similar images, and images for a trash bin and for a road surface may be classified as a pair of dissimilar images. Such pre-classification and pre-training of event subjects are beneficial for the network to learn weights, and make the subsequent learning of event classification more accurate and rapid. Herein, a convolutional neural network is used to automatically recognize events and event subject information is utilized as picture similarity information for supervision, which can improve the accuracy of recognition.

According to some embodiments, the classification model is configured to recognize different event types, the event types including event subject types and event subject status. In addition to functionalities of target recognition and target classification of simply recognizing different body types, such a classification model can also recognize a combined state of different subjects and different states, so that a comprehensive and intelligent classification result can be achieved. As an example, when photos of different street scenes and urban appearances are used as a training set of a model, the model constructed in this way can recognize combined states such as "a manhole cover being damaged", "a trash bin being damaged", "a trash bin overflowing", "trash on the road", etc.

According to some embodiments, the event subject may include at least one of facilities, public appearances, and transportation means, and the event subject status includes at least one of the following: violation of regulations of the event subject, damaged event subject, missed event subject, and no abnormality. For example, facilities may include "trash bins" and "vehicle sheds", public appearances may include corridors, road surfaces, and exterior surfaces of buildings, and transportation means may include parked vehicles. In this way, common road appearance anomalies or urban planning violation incidents can be covered. Certainly, the present disclosure is not limited thereto, and different event subject classification systems may be applied to different use scenarios.

According to some embodiments, training the first sub-network includes training the first sub-network by using Npairs Loss, Triplet Loss, or Contrastive Loss as the loss function. Those three belong to loss functions that can reduce the distance between positive sample pairs and increase the distance between negative sample pairs. In a training using Contrastive Loss, one of a positive sample pair or a negative sample pair is selected each time, and the distance between the positive sample pairs can be made as small as possible while the distance between the negative sample pairs can be made as large as possible, so as to increase an inter-class difference and reduce an intra-class difference. In a training using Triplet Loss, a positive sample pair and a negative sample pair may be selected in the training process with one sample being the same in the positive and negative sample pairs, and the distance between the negative sample pairs can be made greater than the distance between the positive sample pairs. In training using Npairs Loss, a plurality of negative sample pairs may be selected, that is, for one positive sample pair, all other samples of different classes may be selected as negative samples and combined with the positive sample pair to obtain the negative sample pairs. Using such a loss function can effectively decrease the feature distance between similar pictures and increase the feature distance between dissimilar pictures, so that such trained weights facilitate the training of the classification model in the second step of training.

Figure 3A:
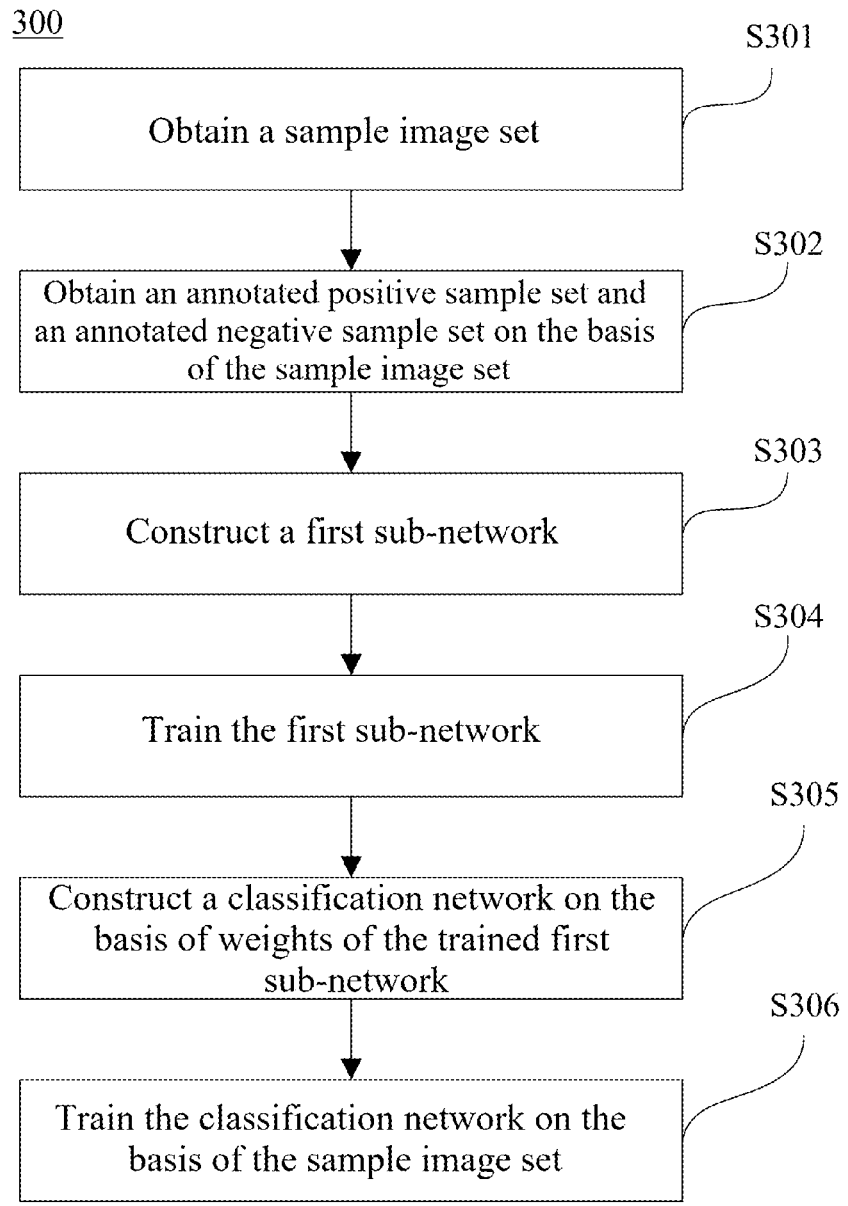
FIG. 3A is a flowchart of a generation method for a classification model according to another embodiment of the present disclosure.

The following describes, with reference to FIG. 3A, a generation method 300 for a classification model according another embodiment of the present disclosure.

At step S301, a sample image set is obtained. The sample image set includes a plurality of images, and each of the plurality of images includes different forms or different types of image representations of a target type to be detected, for feature extraction and learning of a model. For example, each image in the sample image set may be an image captured by a mobile phone, an image uploaded by a user, etc. The obtained image may be preprocessed first. For example, the image may be scaled to fixed dimensions (such as 224*224), and then same is normalized (divided by 255), and subtracted by a mean value (such as [0.485, 0.456, 0.406]) divided by a variance (such as [0.229, 0.224, 0.225]). In this way, an input to a convolutional neural network may be kept between 0 and 1.

At step S302, an annotated positive sample set and an annotated negative sample set are obtained based on the sample image set. The set of positive samples and the set of negative samples may be generated, for example, by annotating images in the sample image set. For example, a first subset in the sample image set may be annotated, or all images in the sample image set may be annotated pairwise. The purpose of annotation is to form similar image pairs and dissimilar image pairs. The criteria for similarity and dissimilarity may be selected based on a final classification purpose of the classification model. For example, images containing the same or similar backgrounds, containing the same or similar objects, captured in similar scenes, captured at the same (or adjacent) geographic location, captured in the same weather or season, or having similar tones or emotional colors are annotated as similar images, and images that do not satisfy the corresponding criteria are annotated as dissimilar images. It can be understood that there may be other classification methods, and the present disclosure is not limited thereto.

At step S303, a first convolutional neural network is constructed, which is referred to as a first sub-network for the convenience of description. The first sub-network may include a plurality of layers. As described above, the first sub-network may use a loss function such as Npairs Loss, Triplet Loss, Contrastive Loss, etc., and the present disclosure is not limited thereto.

At step S304, the first sub-network is trained based on the set of positive samples and the set of negative samples. Therefore, the trained first sub-network may, for example, receive two pictures as inputs, and output a higher value (for example, a normalized value of 1 or close to 1, such as 0.9) when the pictures are similar and output a lower value (for example, 0.2) when the pictures are dissimilar. The first sub-network is used herein as a similarity network, or may be referred to a similarity branch. As described below, weights of the first sub-network will play a role in the supervision of the weight training of a classification network, and therefore, the first sub-network may also be referred to as a supervisory branch.

The first sub-network is trained to obtain such a set of weights that decrease a feature distance between similar pictures and increase a feature distance between dissimilar pictures. Similar pictures and dissimilar pictures are distinguished by means of annotation, and such pre-training can make it easier to group similar pictures into one class, thereby improving the accuracy of a recognition model to be trained next.

Figure 3B:
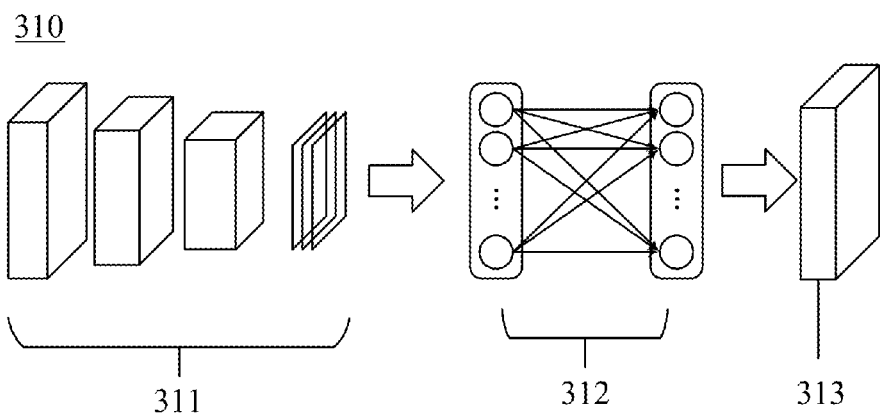
FIG. 3B is an example structural diagram of a classification model according to an embodiment of the present disclosure.

At step S305, a classification network is constructed based on the weights of the trained first sub-network. Specifically, the constructing a classification network based on the weights of the trained first sub-network includes constructing a second sub-network of the classification network based on the weights of the trained first sub-network, so that the second sub-network and the first sub-network have a similar structure, and initial weights of the second sub-network are set to weights of a corresponding node of the trained first sub-network. This can be implemented by, for example, the following method. For example, the second sub-network similar to the first sub-network may be constructed, and then the weight of the trained first sub-network may be obtained and transplanted to the second sub-network. Alternatively, the loss function may be changed directly based on the trained first sub-network, to form the second sub-network. The second sub-network may be a feature extraction portion of the classification network, and the classification network may be constructed by adding a fully connected layer and softmax following the second sub-network. The loss function of the classification network may be a softmax loss. The classification network may use a resnet50 model, such as a resnet50_vd model. FIG. 3B is an example of a classification model. In FIG. 3B, a network 310 includes a feature extraction portion 311, a fully connected layer 312, and a softmax layer 313. Although a specific number of layers are shown in FIG. 3B, it can be understood that the present disclosure is not limited thereto. In addition, those skilled in the art will understand that the network is not limited to such a structure.

At step S306, the classification network is trained by using images in the sample image set. The training a classification network by using images in the sample image set may include a similar image preprocessing step. For example, each (for example, preprocessed) image in the sample image set may be used to train the classification network without annotation. Alternatively, images (for example, preprocessed images) in a second subset of the sample image set may be used to train the classification network. In this case, the second subset and the first subset may have at least part of images thereof in common. Alternatively, the second subset may include exactly the same images as the first subset.

In some cases, the classification network may be referred as a recognition branch, for differentiation from the foregoing similarity branch. However, it should be understood that such an expression does not imply that the two networks are structurally connected and dependent, and either of the two networks can operate independently and achieve separate similarity determination and recognition effects. The recognition branch may first perform feature extraction on a picture through a convolutional neural network, and the convolutional neural network shares weights with a feature network of a background similarity branch, and then a fully connected layer plus softmax may be used to classify the picture.

A finally trained classification network may output a recognized target class, and optionally output a confidence level corresponding to the class. For example, the classification network can output all possible classes and corresponding confidence levels thereof. Alternatively, the output of the classification network may be one or more target types that satisfy only a predetermined confidence level requirement. For example, a final output result is a type with the highest confidence level, types with the top three confidence levels, a type with a confidence level higher than a predetermined threshold (for example, 0.8), etc., and the present disclosure is not limited thereto.

Figure 4:
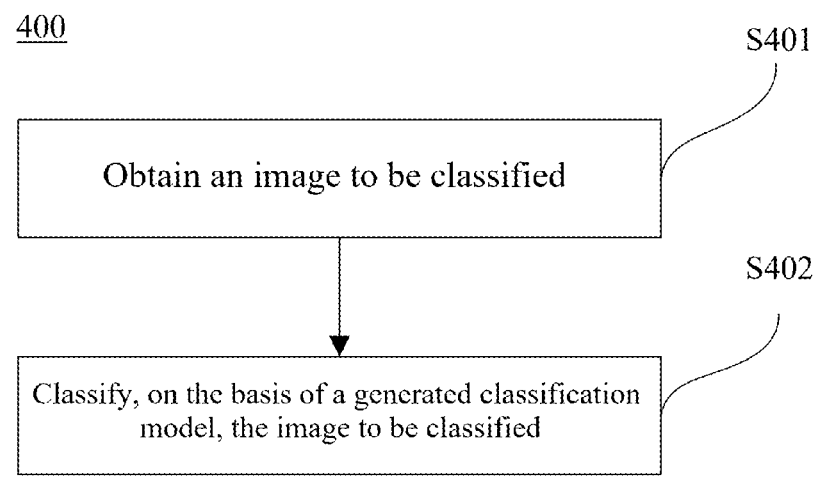
FIG. 4 is a flowchart of a classification method according to an embodiment of the present disclosure.

The following describes, in conjunction with FIG. 4, a classification method 400 according to some embodiments of the present disclosure.

At step S401, an image to be classified is obtained.

At step S402, the image to be classified is classified based on a classification model. The classification model may be generated and trained based on the generation method (for example, the method 200 or 300) according to the embodiments of the present disclosure. For example, the classification model may use the structure of the network 310 as described above, and the present disclosure is not limited thereto.

According to the foregoing method 400, the model trained by using the embodiment of the present disclosure can be used to perform accurate target classification. Specifically, because the generation method according to the present disclosure includes a supervised learning step based on a manually annotated similarity, it is possible to decrease a feature distance between similar images/increase a feature distance between dissimilar images before the training of target recognition. Compared with a traditional simple target recognition network process, the model generated through such a step can more easily avoid over-fitting or learning of irrelevant factors, and more accurate target recognition results can be obtained. Therefore, by using such a model to classify an image, similar pictures can be more easily grouped into one class, thereby improving the accuracy of the classification model and achieving better target recognition and image classification effects.

According to some embodiments, the output of the classification model may indicate a plurality of possible target types, and the output of the classification model may further include a corresponding confidence level of each target type. A plurality of possible target types and corresponding confidence levels can be output for users to select, etc.

According to some embodiments, the output of the classification model may indicate one or more target types with a confidence level thereof in the image satisfying a confidence level requirement. It is possible to output only target types meeting the confidence level requirement, such as a target type with a confidence level greater than 0.8, and the target types with the top three confidence levels.

According to some embodiments, the target type is an event type in the image. The application side can recognize an event type shown in the image, which can greatly expand the application of the classification model. Optionally, as described above, the event type may include event subject types and event subject status, so that, for example, the classification of complex scenes of different event subjects and different statuses thereof can be recognized.

An exemplary non-limiting scenario in which the classification method according to the present disclosure can be applied is described below.

With the continuous development of the Internet and artificial intelligence technologies, more and more fields have been related to automatic computing and analysis. In new planning, the term "new infrastructure" has appeared more frequently. Smart cities are currently one of the most important scenarios. According to the classification method in the embodiments of the present disclosure, violations in streets can be automatically recognized in smart city management. For example, in city management, a city management department may employ a large number of grid administrators to go to the streets to conduct inspections every day, use mobile phones to take photos of violation evidence from various angles, upload the photos, and then select from hundreds of violation categories to add remarks. This consumes much time and effort. In view of street violation incidents, the existing technical solutions lack technical height and depth, and basically require manual selection, which consumes much time and effort, and requires the grid administrators to be highly capable, and has disadvantages such as high time and labor costs.

The method in the present disclosure can be applied to the city management department to automatically recognize a violation category in a photo based on the photo taken by a person in charge. According to the classification model and classification method in the present disclosure, an anomaly event type can be automatically recognized, an event class can be reported automatically, and the selection costs of the grid administrators can be reduced.

For example, in an existing anomaly reporting scenario, to report a case, it is necessary to upload case filing photos (one to three photos), a case type, a geographic location of the case, and a case description, all of which are completed before the case can be reported. For the case type, a grid administrator needs to manually select a case (event/component) category from a drop-down menu. In contrast, according to the method of the present disclosure, an automatic event type (for example, a violation type) recognition service can be provided, and a category label can be given through automatic recognition based on a case filing photo uploaded by a user.

The case type or the violation type can be a collective term for anomalous behavior and anomalous behavior. For example, the anomalous behavior may mean illegal and traffic offense behaviors such as "exposing trash", "parking (non-)motor vehicles disorderly", and "hanging clothes along the street". The anomalous component may include an infrastructure/device being damaged or lost, for example, a manhole cover being damaged. In the present disclosure, anomalous behaviors and components may not be distinguished, and may be collectively referred to as event subjects. Other examples of violation scenarios may be there being trash on the road, the road being unclean, a trash bin overflowing, illegal construction, a manhole cover being damaged, and other issues related to urban appearances. According to the above description, the event subject may include at least one of facilities, public appearances, and transportation means, and the event subject status includes at least one of the following: violation of regulations of the event subject, damaged event subject, missed event subject, and no abnormality. For example, for the anomaly of the road being unclean, the event subject type may be a public appearance "road", and the event subject status is a violation type of "trash being scattered on the road". For another example, for the anomaly of a manhole cover being damaged, the event subject type is the public facility "manhole cover", and the event subject status is a damage. For another example, for the anomaly of parking vehicles disorderly, the event subject may be a transportation means "motor vehicle (or non-motor vehicle)", and the event subject type may be a violation (for example, parking the vehicle at a location where the vehicle should not be parked). It can be understood that the present disclosure is not limited thereto.

A trained recognition network can be used to recognize and classify violation behavior in a picture, thereby improving the efficiency of grid administrators. Scientific and technological means are used to make city management more intelligent, and avoid classification solutions that require a lot of human efforts.

It can be understood that the above description of urban violation incidents is only an example of "events", and the classification model according to the present disclosure can be applied to the recognition of other various types of events, for example, animal forms, natural events, device status monitoring, human behavior detection and classification, etc. Those skilled in the art will also understand that the classification model according to the present disclosure can also be applied to the detection of only a target type that does not include an event status, and can achieve accurate classification and recognition effects.

Figure 5:
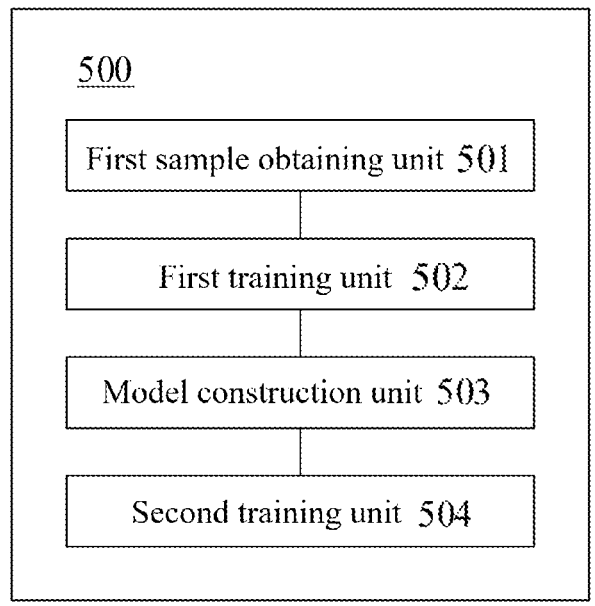
FIG. 5 is a structural block diagram of a generation apparatus for a classification model according to an embodiment of the present disclosure.

The following describes, in conjunction with FIG. 5, a generation apparatus 500 for a classification model according to an embodiment of the present disclosure.

The apparatus 500 may include a first sample obtaining unit 501, a first training unit 502, a model construction unit 503, and a second training unit 504. The first sample obtaining unit 501 may be configured to obtain a set of positive samples and a set of negative samples, a sample in the set of positive samples including a pair of images from a first image set annotated as similar with each other, and a sample in the set of negative samples including a pair of images annotated as dissimilar with each other from the first image set. The first training unit 502 may be configured to train a first sub-network based on the set of positive samples and the set of negative samples. The model construction unit 503 may be configured to construct a classification model, the classification model including a second sub-network, and initial weights of the second sub-network being weights of corresponding nodes of the trained first sub-network. The second training unit 504 may be configured to train the classification model by using a second image set as a training set, wherein at least one image in the second image set is common with at least one image in the first image set.

According to some embodiments, the second sub-network is used as a feature extraction portion of the classification model. According to some embodiments, the model construction unit 503 is further configured to: use the trained first sub-network as the second sub-network in an initial state, and use a second loss function that is different from a first loss function of the first sub-network as a loss function of the classification model. According to some embodiments, each image in the first image set and each image in the second image set includes an event subject, the pair of images annotated as similar with each other includes images containing the same event subject, and the pair of images annotated as dissimilar with each other includes images containing different event subjects.

Figure 6:
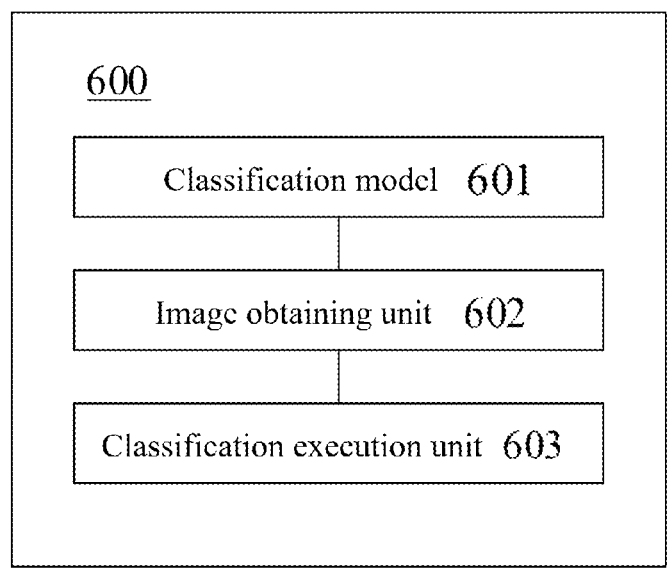
FIG. 6 is a structural block diagram of a classification apparatus according to an embodiment of the present disclosure.

The following describes, in conjunction with FIG. 6, a classification apparatus 600 according to an embodiment of the present disclosure.

The apparatus 600 may include a classification model 601, an image obtaining unit 602, and a classification execution unit 603. The classification model 601 may be generated and trained based on the generation method (for example, the method 200 or 300) according to the embodiments of the present disclosure. The image obtaining unit 602 may be configured to obtain an image to be classified.

The classification execution unit 603 may be configured to classify, based on the classification model 601, the image to be classified.

According to an embodiment of the present disclosure, there is further provided an electronic device, a readable storage medium, and a computer program product.

Figure 7:
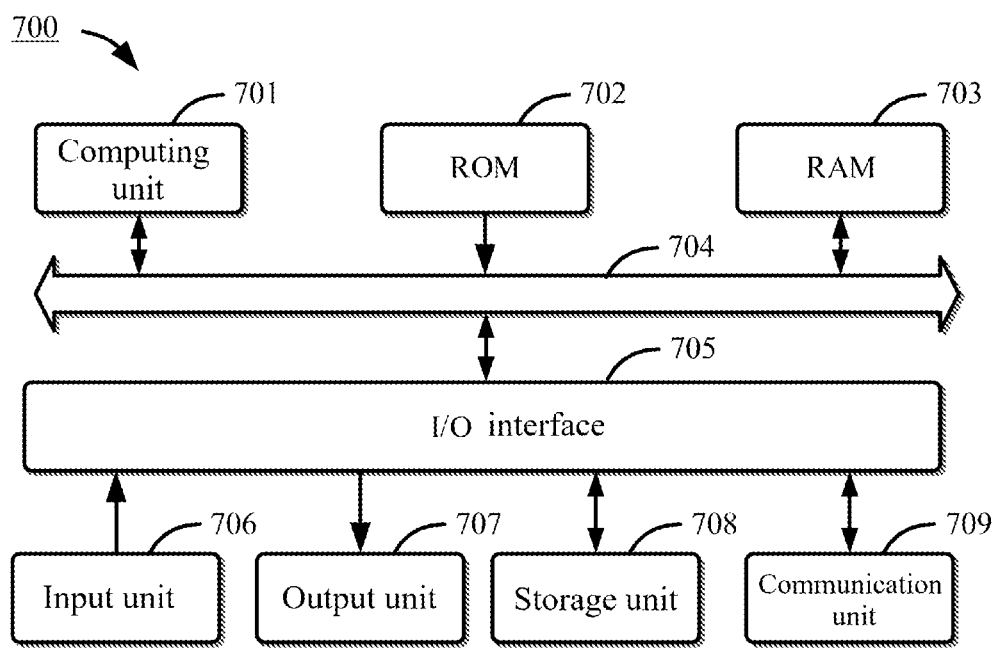
FIG. 7 is a structural block diagram of an exemplary electronic device that can be used to implement an embodiment of the present disclosure.

Referring to FIG. 7, a structural block diagram of an electronic device 700 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the device 700 comprises a computing unit 701, which may perform various appropriate actions and processing according to a computer program stored in a read-only memory (ROM) 702 or a computer program loaded from a storage unit 708 to a random access memory (RAM) 703. The RAM 703 may further store various programs and data required for the operation of the device 700. The computing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, an output unit 707, the storage unit 708, and a communication unit 709. The input unit 706 may be any type of device capable of entering information to the device 700. The input unit 706 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 707 may be any type of device capable of presenting information, and may include, but is not limited to, a display, a speaker, a video/audio output terminal, a vibrator, and/or a printer. The storage unit 708 may include, but is not limited to, a magnetic disk and an optical disc. The communication unit 709 allows the device 700 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMax device, a cellular communication device and/or the like.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 performs the various methods and processing described above, for example, the method 200 or 300. For example, in some embodiments, the method 200 or 300 may be implemented as a computer software program, which is tangibly contained in a machine-readable medium, such as the storage unit 708. In some embodiments, a part or all of the computer program may be loaded and/or installed onto the device 700 via the ROM 702 and/or the communication unit 709. When the computer program is loaded to the RAM 703 and executed by the computing unit 701, one or more steps of the method 200 or 300 described above can be performed. Alternatively, in other embodiments, the computing unit 701 may be configured, by any other suitable means (for example, by means of firmware), to perform the method 200 or 300.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may comprise: the systems and technologies are implemented in one or more computer programs, where the one or more computer programs may be executed and/or interpreted on a programmable system comprising at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

A program code used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) comprising a backend component, or a computing system (for example, an application server) comprising a middleware component, or a computing system (for example, a user computer with a graphical user interface or a web browser through which the user can interact with the implementation of the systems and technologies described herein) comprising a frontend component, or a computing system comprising any combination of the backend component, the middleware component, or the frontend component. The components of the system can be connected to each other through digital data communication (for example, a communications network) in any form or medium. Examples of the communications network comprise: a local area network (LAN), a wide area network (WAN), and the Internet.

A computer system may comprise a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

Although the embodiments or examples of the present disclosure have been described with reference to the drawings, it should be understood that the methods, systems and devices described above are merely exemplary embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method for generating a classification model, the method comprising:
    obtaining a set of positive samples and a set of negative samples, wherein a sample in the set of positive samples includes a pair of images from a first image set annotated as similar with each other, and a sample in the set of negative samples includes a pair of images from the first image set annotated as dissimilar with each other;
    training a first sub-network based on the set of positive samples and the set of negative samples;
    constructing a classification model, the classification model including a second sub-network, wherein initial weights of nodes of the second sub-network are weights of corresponding nodes of the trained first sub-network; and
    training the classification model by using a second image set as a training set, wherein at least one image in the second image set is common with at least one image in the first image set.

2. The method according to claim 1, wherein the second sub-network is used as a feature extraction portion of the classification model.

3. The method according to claim 1, wherein constructing the classification model comprises:
    using the trained first sub-network as the second sub-network in an initial state; and
    using a second loss function that is different from a first loss function of the first sub-network as a loss function of the classification model.

4. The method according to claim 1, wherein the first image set and the second image set are the same image set.

5. The method according to claim 1,
    wherein each image in the first image set and each image in the second image set comprises an event subject;
    wherein the pair of images annotated as similar with each other in the first image set comprises images containing a same event subject; and
    wherein the pair of images annotated as dissimilar with each other in the first image set comprises images containing different event subjects.

6. The method according to claim 1, wherein the classification model is configured to recognize different event types, the event types comprising event subject types and event subject status.

7. The method according to claim 6,
    wherein the event subject types comprise at least one of facilities, public appearances, or transportation means; and
    wherein the event subject status comprises at least one of: violation of regulations of event subject, damaged event subject, missed event subject, or no abnormality.

8. The method according to claim 1, wherein training the first sub-network comprises training the first sub-network by using Npairs Loss, Triplet Loss, or Contrastive Loss as a loss function.

9. An electronic device, comprising:
    at least one processor; and
    a memory communicatively connected to the at least one processor, wherein the memory stores instructions executable by the at least one processor that, when executed by the at least one processor, cause the at least one processor to perform a method comprising:
    obtaining a set of positive samples and a set of negative samples, wherein a sample in the set of positive samples includes a pair of images from a first image set annotated as similar with each other, and a sample in the set of negative samples includes a pair of images from the first image set annotated as dissimilar with each other;
    training a first sub-network based on the set of positive samples and the set of negative samples;

constructing a classification model, the classification model including a second sub-network, wherein initial weights of nodes of the second sub-network are weights of corresponding nodes of the trained first sub-network; and training the classification model by using a second image set as a training set, wherein at least one image in the second image set is common with at least one image in the first image set.

10. The electronic device of claim 9, wherein the second sub-network is used as a feature extraction portion of the classification model.

11. The electronic device of claim 9, wherein constructing the classification model comprises:

using the trained first sub-network as the second sub-network in an initial state; and using a second loss function that is different from a first loss function of the first sub-network as a loss function of the classification model.

12. The electronic device of claim 9, wherein the first image set and the second image set are the same image set.

13. The electronic device of claim 9, wherein each image in the first image set and each image in the second image set comprises an event subject;

wherein the pair of images annotated as similar with each other in the first image set comprises images containing a same event subject; and wherein the pair of images annotated as dissimilar with each other in the first image set comprises images containing different event subjects.

14. The electronic device of claim 9, wherein the classification model is configured to recognize different event types, the event types comprising event subject types and event subject status.

15. The electronic device of claim 14, wherein the event subject types comprise at least one of: facilities, public appearances, or transportation means; and wherein the event subject status comprises at least one of: violation of regulations of the event subject, damaged event subject, missed event subject, or no abnormality.

16. The electronic device of claim 9, wherein training the first sub-network comprises training the first sub-network by using Npairs Loss, Triplet Loss, or Contrastive Loss as a loss function.

17. A non-transitory computer-readable storage medium storing computer instructions that, when executed, cause a computer to perform a method comprising:

obtaining a set of positive samples and a set of negative samples, wherein a sample in the set of positive samples includes a pair of images from a first image set annotated as similar with each other, and a sample in the set of negative samples includes a pair of images from the first image set annotated as dissimilar with each other;

training a first sub-network based on the set of positive samples and the set of negative samples;

constructing a classification model, the classification model including a second sub-network, wherein initial weights of nodes of the second sub-network are weights of corresponding nodes of the trained first sub-network; and training the classification model by using a second image set as a training set, wherein at least one image in the second image set is common with at least one image in the first image set.

18. The non-transitory computer-readable storage medium according to claim 17, wherein the second sub-network is used as a feature extraction portion of the classification model.

19. The non-transitory computer-readable storage medium according to claim 17, wherein constructing the classification model comprises:

using the trained first sub-network as the second sub-network in an initial state; and using a second loss function that is different from a first loss function of the first sub-network as a loss function of the classification model.

20. The non-transitory computer-readable storage medium according to claim 17, wherein the first image set and the second image set are the same image set.

* * * * *